United States Patent [19]

Sama et al.

[11] 4,355,228
[45] Oct. 19, 1982

[54] IMAGE ANALYZER WITH LIGHT PEN OR THE LIKE AND SHADING CORRECTOR

[75] Inventors: Stephen L. Sama, Seaford; William R. Kitchener, Northport, both of N.Y.

[73] Assignee: Artek Systems Corporation, Farmingdale, N.Y.

[21] Appl. No.: 96,437

[22] Filed: Nov. 21, 1979

Related U.S. Application Data

[63] Continuation-in-part of Ser. No. 883,996, Mar. 6, 1978, Pat. No. 4,203,029.

[51] Int. Cl.³ ............................................. G06M 11/04
[52] U.S. Cl. ................................. 235/92 PC; 358/163
[58] Field of Search ......... 235/92 PC, 92 CA, 92 PL; 364/416; 358/163, 107; 340/146.3 AG

[56] References Cited

U.S. PATENT DOCUMENTS

| | | | |
|---|---|---|---|
| 3,728,481 | 4/1973 | Froehlich et al. | 358/163 |
| 3,743,772 | 7/1973 | Pieters | 358/163 |
| 3,919,473 | 11/1975 | Cotter | 358/163 |
| 3,922,532 | 11/1975 | Kitchener et al. | 235/92 PC |

Primary Examiner—Joseph M. Thesz
Attorney, Agent, or Firm—Posnack, Roberts, Cohen & Spiecens

[57] ABSTRACT

A shading corrector is provided for an image analyzer. The shading corrector is capable of storing an image presented to a raster scanning television camera included in the overall system. A memory is used to store camera video voltage variations which are representative of an object-free background field. When specimens are subsequently introduced into the field of view, the resulting video voltage may be compared in a voltage comparator to the stored background reference. A circuit is provided to correct the stored background and provision is made for using the background of a juxtaposed position in the event that the background used for the correction is covered by an object. The system is also provided with a light pen or equivalent device for identifying positions in the raster at which modifications are desired. Provision is then made for correcting images at these selected positions such as by adding to or subtracting from the images.

8 Claims, 11 Drawing Figures

IMAGE ANALYZER WITH LIGHT PEN OR THE LIKE AND SHADING CORRECTOR

OTHER APPLICATIONS

This application is a continuation-in-part of copending application Ser. No. 883,996, filed Mar. 6, 1978, and now U.S. Pat. No. 4,203,029.

FIELD OF INVENTION

This invention relates to image analyzers and, more particularly, to image analyzers provided with light pens or the like for the purpose of picking out positions at which corrections are to be made to an image. The invention also relates to image analyzers provided with means for shading correction.

BACKGROUND

In the field of medicine and laboratory science, the automation of medical laboratory procedures and the like has become necessary in order to cope with the massive amounts of testing and other procedures which are now required. At one time, it was possible to count bacteria colonies in a culture sample by eye to determine the number of colonies in a specimen. However, automation of this type of procedure has become essential.

Additionally, while a simple count of the number of colonies in a specimen can be carried out manually, it is often desired to select only a particular area of the sample and restrict the count to that area. Sometimes, various size and density minimums must also be set whereby only the count of colonies greater than these minimum levels are to be included.

It is furthermore oftentimes necessary to obtain an area measurement of a complex shaped object as, for example, a cell or a component of a cell, such as its nucleus. Accurate measurements of this type have heretofore been obtained by time-consuming and costly methods. Such variations and specialized counting further necessitates the need for automation in the field of microbiological counting.

Colony counters are already available which attempt to satisfy the above-mentioned needs. By way of example, U.S. Pat. No. 3,811,036 entitled "MICROBIOLOGICAL COLONY COUNTER," issued on May 14, 1974, and assigned to the assignee of the present invention, describes a basic automatic colony counter which places a flag on each colony detected and displays the output. U.S. Pat. No. 3,757,299, entitled "METHOD AND APPARATUS FOR MEASURING THE SIZE OF ZONES OF INHIBITION IN AN ASSAY MEDIUM," issued on Sept. 4, 1973, and assigned to the assignee of the present invention, describes various types of pattern recognition and measuring systems for certain types of colonies and similar microbiological items to be detected. Also, U.S. Pat. No. 3,922,532, entitled "CELL COUNTER," issued on Nov. 25, 1975, and assigned to the assignee of the present invention, describes an improved counter which can count objects in a sample and includes both size and density discrimination.

While the aforementioned apparatus, as well as other prior art devices, provide for automation of the field of microbiological counting and displaying, these units do not present the versatility needed in such apparatus in order to permit its use in a variety of application. For example, the particular area of the sample which is scanned remains constant in such apparatus and there is no means provided for modifying the size and/or shape of the area being scanned.

Similarly, with many such devices, the holder of the sample covers a portion of the sample itself and, therefore, the entire area cannot be scanned. As a result, the count scanned is not a complete count for the entire sample and no compensation is provided for this type of automatic counting. Additionally, it is frequently desired to provide additional measurements such as the percent of area covered by the colonies or the absolute area of the colonies. Prior art devices have not provided for such capabilities.

As a result, despite the success of many of the apparatus, complete versatility and use for many applications have thus far not been provided.

SUMMARY OF INVENTION

It is an object of the invention to provide an improved image analyzer.

It is a further object of the invention to provide an improved image analyzer having therein facilities for shading correction.

Yet another object of the invention is to provide an improved image analyzer having a light pen or the like in order to select a specific position on a television raster at which a modification of an image may be effected.

In achieving the above and other objects of the invention, there is provided in accordance with one embodiment thereof an image analyzer for counting objects in a field and provided with a shading corrector adapted for measuring the relative amount of chromophore in a scanned object, said shading corrector comprising means to supply a stored video background signal, an attenuator for receiving and attenuating said signal, computer means for controlling said attenuator, means to supply an object-modulated video signal, comparator means for comparing the attenuated signal and the video signal to produce a comparator output signal, and an area counter means to receive said output signal and develop a count proportional to the time-width of the scan across the chromophore to represent the area of the chromophore, said count being fed to said computer means.

According to a particularly advantageous aspect of the invention, the aforesaid attenuator is a digitally controlled attenuator.

According to another aspect of the invention, there is provided an image analyzer for counting objects in a field with a shading corrector adapted for correcting background signals representative of the background against which objects are counted or inspected. The shading corrector comprises means for receiving background video signals representative of a field with and without objects therein, peak detector means to detect peaks in said signals and to generate signals in accordance therewith, processing means responsive to said video signals and to said peak detector means to generate signals corresponding to the ratio of said video signals and the signals of said peak detector means, memory means to store the signals generated by said processing means, and further processing means to receive signals from the peak detector means and to combine them with the thusly stored signals to generate shade-corrected signals.

According to another aspect of the invention, the first said processing means mentioned above may include an analog-to-digital converting means whereby to produce a digital signal for storage. Furthermore, the second said processing means may include a digital-to-analog converting means whereby to produce an analog output signal.

In accordance with the invention, there may be provided attenuation means to vary the magnitude of the analog output signal and a means may be provided in accordance with a particularly advantageous aspect of the invention to select a background position adjacent to or juxtaposed to an object to be counted or inspected to form the basis for background correction.

In accordance with still another aspect of the invention, there is provided an image analyzer comprising video display means, including means to effect a raster, means to coact with said raster to identify a specific position on the display means, and control means to effect a modification of an image at said specific position on said display means.

In accordance with a preferred embodiment of the invention, said control means may include video memory means and program memory means and central processing means for accessing both said memory means, said video memory means storing the image to be modified according to the process stored in the program memory means.

According to another and preferred aspect of the invention, said control means may further comprise shift register means for receiving and transmitting digitized video signals and address means for selectively locating the digitized video signals in the video memory means.

In accordance with still another very important aspect of the invention, said control means may include a light pen coacting with said raster, there being latch means and shift register means coupled to said light pen and coupled to said central processing means to supply addresses thereto.

In accordance with yet another aspect of the invention, input/output decoder means may be coupled to and strobed by said central processing means to transfer addresses to the latter.

The above and other objects, features, and advantages of the invention will be found in a detailed description which follows hereinafter, as illustrated in the accompanying drawing.

DETAILED DESCRIPTION

This application includes by reference the disclosure of application Ser. No. 883,996 filed Mar. 6, 1978, a portion of which appears below.

Figure 1:
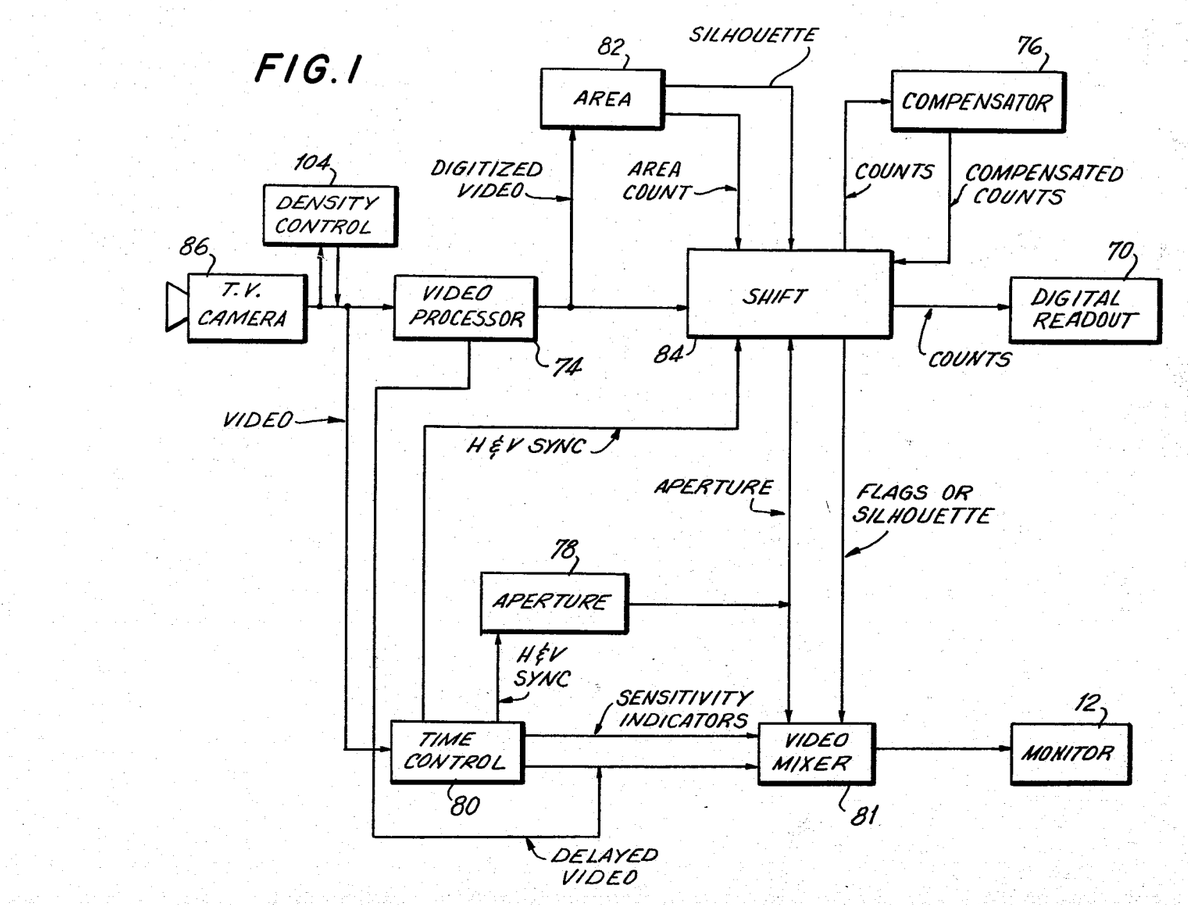
FIG. 1 is a block diagram of an image analyzer provided in accordance with the invention to be modified as indicated hereinbelow.

In FIG. 1, there is shown an overall block diagram of the circuit of the present invention. The TV camera 86 focuses onto a sample to be counted and displayed. The output signal consists of a series of horizontal scan lines with information contained on those scan lines. The information is sent to the timing control printed circuit board 80 where the horizontal and vertical synchronization signals are separated from the composite video. It is also possible for the control circuit 80 to accept individual horizontal and vertical drives. The timing control card includes delay and size generators which control the vertical size and position along with the horizontal position of the counting window.

The video signal is also sent to the video processing card 74 which includes the active differentiation and amplification of the signal. The signal is digitized on this circuit card, whereby leading and trailing edges generate a single pulse. The video processing card also includes the necessary switching means under control of the image switch (not shown) on the front panel, whereby the leading and trailing edges can be reversed to thereby identify negative or positive video. The sensitivity controls are also contained on this card. A sensing means is used to determine the average noise level of the incoming video to thereby establish a maximum sensitivity threshold. Comparison means are available to sample the sensitivity setting based on a front panel sensitivity control knob and the average noise level to thereby establish a point of maximum sensitivity. This circuit then produces the control of the upper indicator line on the display to appropriately identify the maximum sensitivity. Similarly, division means are included whereby the average noise level is reduced to establish a minimum sensitivity threshold and appropriate control of the lower tuning indicator line on the display is available to identify this minimum sensitivity threshold. As was indicated, this is available during the course of the manual control. However, during the course of the automatic control the feedback means takes over whereby such control is automatic without the need of achieving maximum or minimum control by means of the tuning indicator lines.

The output from the video processor card 74 is then sent to the shift card 84, which also receives the horizontal and vertical synchronization signals from the timing control card 80. The shift card 84 includes the circuitry which produces the flag and count pulses. This card makes the decision which objects should be flagged and counted. The decision is based upon the determination of whether a particular object has been previously counted on a different horizontal scan line. Additionally, the input from the size control knob (not shown) on the front panel is also used as a criteria to determine which objects should be counted. Specifically, only those colonies exceeding the selected size will be counted. The shift card 84 produces count outputs which are sent to a digital readout card 70, as well as flags or silhouette signals which are sent to a video mixer 81 which is actually included on the timing control card 80.

The digitized video signal from the video processor 74 is also sent to the absolute area card 82. This card provides a bright silhouette around all objects detected within the particular electronic aperture window. It also measures the absolute area of the objects detected in the form of a series of pulse trains, where the number of pulses is proportional to the object area. It also measures the electronic aperture area by utilizing the same area measuring means. Fine and continuous adjustment as well as coarse wide-range adjustment is included in order to refine the particular area measurements. The output of both the silhouette as well as the area count passes through the shift card.

In place of the absolute area card 82 an optional feature permits the use of a percent area card. This card would also provide the silhouette around the objects detected. However, it would then measure the ratio of the detected object area to the electronic aperture window area and provide from zero to 100 count pulses representing ratio in percent value. The percent area printed circuit card would also include circuits to generate a high frequency clock of twice the rate of a low frequency clock pulse train. Also, it would detect a minimum electronic aperture area needed for which the percent area calculator has maximum accuracy. The object silhouettes would flash below that minimum value.

The counts produced by the shift card 84 are sent directly to the digital readout card 70 but can be compensated by means of the compensator printed circuit card 76. The compensator card provides count modification whereby additional counts may be added to the count stream. The actual count may be modified in 1% increments from zero to 79%. The use of the front panel compensation controls is available for programming the additional counts in the specified increments desired. The compensated counts are then returned back to the shift circuit 84 to be sent to the digital readout 70.

The aperture card 78 receives the horizontal and vertical synchronization signals from the timing control card 80, and is utilized to create the desired area configuration, the size of that area, as well as the position of that area. The aperture card 78 includes the necessary circuitry for creating a circular region of enhanced illumination on the standard television monitor display. Also, it includes the circuitry for creating both the square and rectangular regions of such enhanced illumination. It then can restrict the counting area to the selected region of enhanced illumination. Additional circuitry under control of the front panel knobs are included to vary the size of the area selected from zero to the maximum allowed on the television screen. Furthermore, the circuits include a way of independently adjusting both the height and width of the enhanced region through the front panel controls. A closed loop is provided for maintaining the constancy of the selected size of the enhanced region. This includes a way of measuring the enhanced region size by conversion to an equivalent voltage level and comparing the voltage level to a reference level. The difference of these voltage levels is then taken and automatically utilized to change the size of the enhanced region to make this difference approach zero. Also included are circuits for splitting this closed loop into two loops, one of which provides slow automatic control of the enhanced region for small voltage differences, and a second with fast automatic control of enhanced region size for large voltage differences. Also included on this card are circuits for moving the center of the enhanced region to any point in the television raster. An independent control over both vertical and horizontal positioning is provided on the front panel for this use. Finally, switching means is available to select any one of the enhanced regions or to completely remove the aperture control whereby the entire area will be scanned and flagging and counting will be enabled throughout the television raster area.

The digital outputs of both the numeric counts of the objects as well as the area counts are sent to the digital readout card 70. This card provides the necessary counting and decoding as well as displaying the digital values. It also provides the availability of positive and negative push buttons for adding and subtracting from the display counts. The output is displayed in binary coded decimal and there is also provided a "new count initiate pulse" which indicates that a new count is forthcoming.

The various video signals are sent to the video mixer circuit 81 which forms part of the same printed circuit board as the timing control 80. This circuit receives the aperture signals from the aperture card 78 as well as the flags and silhouette signals from the shift card 84. It also receives a delayed video directly from the video processor 74. The upper and lower tuning indicators are added to the video signal for a monitor indication of the high and low sensitivity levels. The aperture and flag controls for optimizing the relative monitor contrast of the electronic aperture, flags, and the entire scene are also included. The output from the video mixer is then sent to the television monitor 12 for final display.

Optionally included is also a density control card 104 which can receive the video signal and appropriately adjust it in accordance with predetermined absorption levels of the objects to be counted. The information then sent on to the rest of the system will only include those objects which have absorptions greater than the preselected absorption level. Also optional is a size distribution circuit, which will be described.

The aforesaid circuitry is disclosed in copending application Ser. No. 883,996. The following modifications of that circuitry are intended to provide both shading correctors and image modification features to the foregoing circuitry.

The image analyzer of the invention includes shading corrector circuitry which is capable of storing indefinitely the image presented to the raster scanning television camera included in the system. This image may, for example, store 256 levels of gray and in one version has a 128×128 element spatial resolution of the field. This memory is effectively used to store camera video voltage variations which are representative of an object-free background field. When specimens are subsequently introduced into the field of view, the resulting video voltage may be compared in a simple voltage comparator to the stored background reference. The resultant pulse output of the comparator will be temporal to the scanning of the objects and therefore represents a digitized version of the object field. Detection of the objects is controllable by applying a variably attenuated version of the background reference to the comparator. The digitized object pulses may be manipulated to measure various large parameters for the viewed objects, including in particular, the area of an object. This is essentially done by gating a clock to a scanning counter by means of the digitized object pulses to derive the object area.

It will be shown that with only a simple improvement of the features mentioned above, a measurement of the relative amount of chromophore in a scanned object can be made. Specifically, the intention is to emulate the Beer-Lambert absorption law:

$$KM = AD = -A \log T = A(\log I_o - \log I) \quad (1)$$

where K is the specific absorptivity of the chromophore at a particular light wavelength, M is the amount of chromophore, A is the area over which the measurement is made, D is the optical density, T is the transmission through the chromophore, I is the light intensity over the chromophore, and $I_o$ is the light intensity before introduction of chromophore. In the strictest definition, the law requires that it be applied for chromophore that is homogeneously distributed and that the illumination be monochromatic and perpendicular to the specimen plane. The constraints on illumination are provided for by optimizing the optical system and introducing narrow band tight filters as are necessary in a particular application. The requirement for chromophore homogeneity is related to the particular specimen itself and is achieved through the implementation of a machine approximation to an integral form of the absorption law.

If the viewing field is subdivided into sufficiently small resolution elements, these elements may be considered homogeneous in chromophore distribution. The required extent to which this subdivision must be carried can be determined from expected properties of the chromophore within an actual specimen and the resolving power of a particular optical arrangement. Equation (1) may now be considered in the following form:

$$A\overline{D} = - \int_A (\log t) \, dA \quad (2)$$

where $\overline{D}$ is the average optical density over a field of area, A, and dA is an infinitesimal elemental area of the field which is homogeneous. t is the transmission through element dA. An approximation to equation (2) can be made by considering finite area elements:

$$A\overline{D} = - \sum^N (\log t_i) \, a_i \quad (3)$$

where the sum is taken for N samples with $t_i$ being the transmission through the approximately homogeneous elemental area $a_i$.

Figure 2:
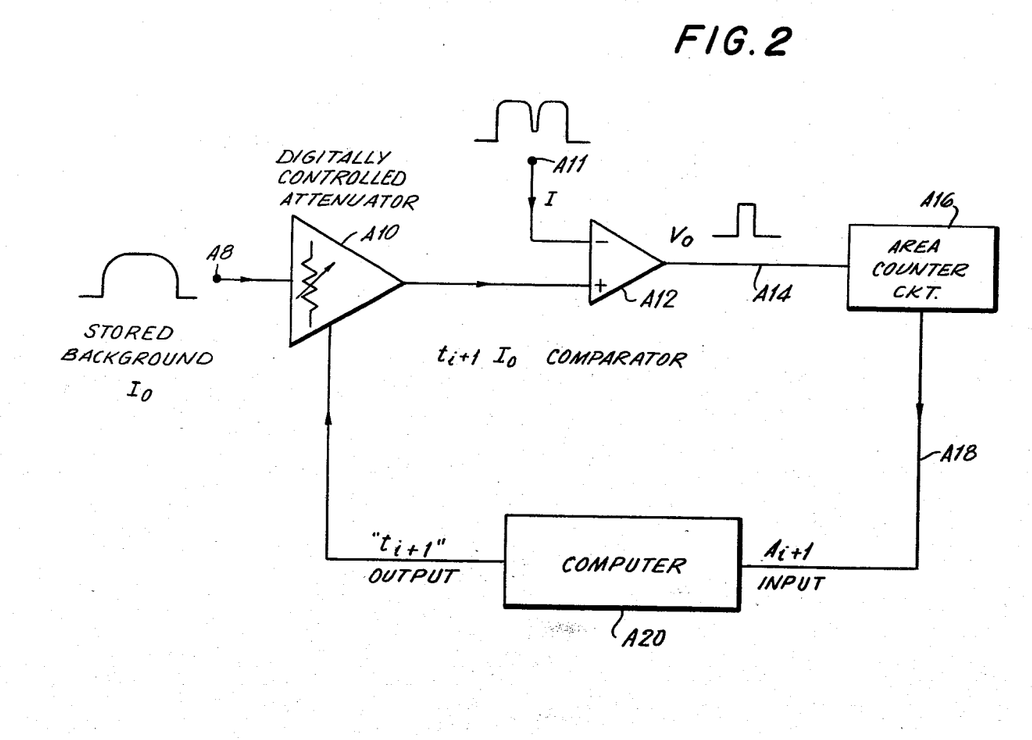
FIG. 2 is a partially schematic, partially block diagram of a modification to be added to the circuit of FIG. 1 for purposes of constituting an integrated density measurement means.

A block diagram of one form of the hardware portion of the realization of equation (3) is shown in FIG. 2. The stored video background voltage is shown as being input via terminal A8 to a digitally controlled attenuator A10 as signal $I_o$. Such an attenuator implemented with multiplying digital-to-analog converters is well known in the art. In the present system an 8-bit digital word is presented to the attenuator by the computer. This permits an attenuator output signal shown as $t_{i+1}I_o$ where $t_{i+1}$ is a value between zero and one in up to 255 possible discrete increments. This signal is then applied to a voltage comparator A12 along with the object-modulated video signal applied at terminal A11. The resultant comparator output is the digital pulse stream shown as $V_o$ on line A14. $V_o$ is used by area counter circuitry A16 to develop a count proportional to the time-width of the scan across the chromophore. This count accumulates for successive scans of the chromophore. The final count shown as $A_{i+1}$ on line A18 will be proportional to the total area of chromophore which exhibits a transmission less than or equal to $t_{i+1}$. This count is available to the computer A20.

Figure 3:
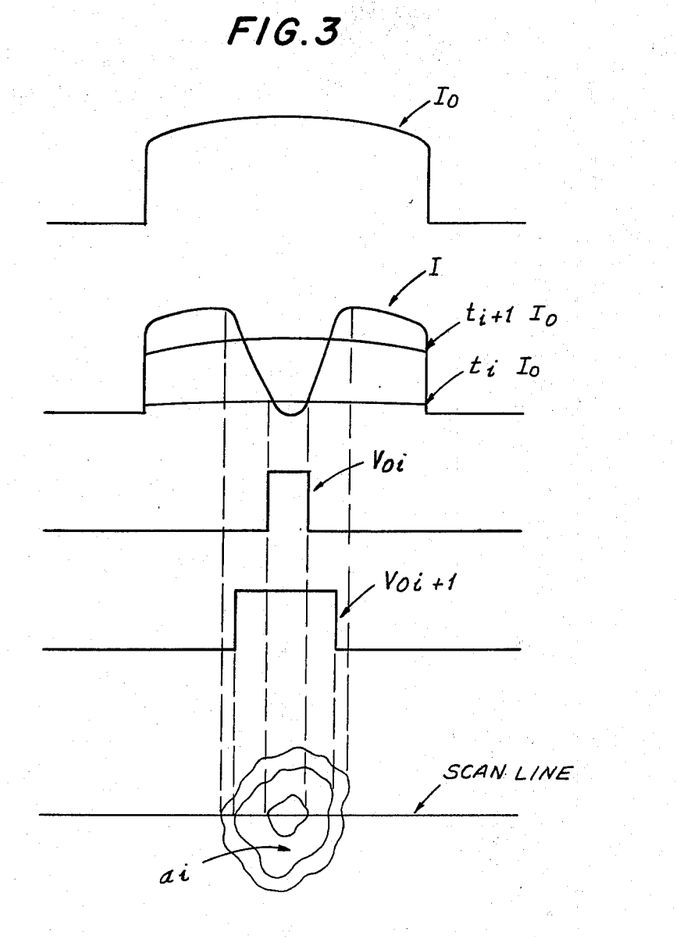
FIG. 3 is a signal chart diagrammatically representing the scanning of a chromophore.

FIG. 3 shows an explicit image-signal diagram to further describe the signal voltage relationships. The computer commands the attenuator A10 and related circuitry to output an area count proportional to enclosed contours of the chromophore which are equal to or darker than the selected transmission levels such as $t_i$ or $t_{i+1}$ as shown. It will be seen from FIG. 3 that an incremental area, $a_i$, can be visualized between the two contours bounded by transmission levels of $t_i$ and $t_{i+1}$. If the increment between $t_i$ and $t_{i+1}$ is sufficiently small, say for example, as small as 0.39%, then the region $a_i$ can be considered approximately homogeneous. The area of this region can directly become a component of equation (3) along with any of $t_i$ or $t_{i+1}$ as deemed preferable, to represent the sample transmission.

Figure 4:
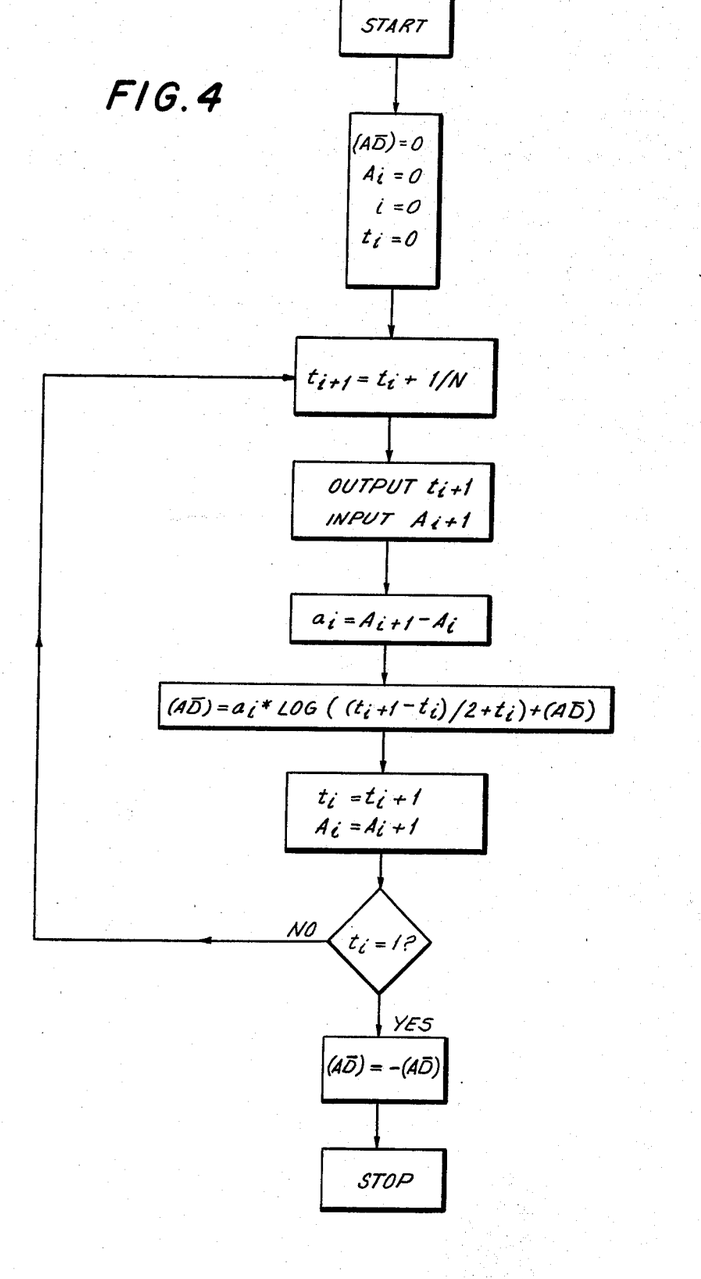
FIG. 4 is a flow diagram illustrating computer operation of the circuit of FIG. 2 in accordance with the diagram of FIG. 3.

The computer measures the area of successively larger and larger contours of the chromophore by incrementally increasing the value of the transmission level, $t_{i+1}$ as presented to the circuitry of FIG. 2. The area of each contour has the area of the last previous contour subtracted from it to obtain $a_i$. The computer then takes the logarithm of the sample transmission and multiplies it by $a_i$. Each such intermediate result is negated and summed together. The final number is the piecewise approximation to an integration of the optical density of all chromophore in the scanned area of the field. The result is available from the computer in various conventional forms of readout such as printout or CRT display. A flow chart of one illustrative method is shown in FIG. 4. This program uses the average value of $t_i$ and $t_{i+1}$ as the sample transmission.

Further versatility is made available in this implementation by slight hardware additions. In certain applications such as in cytological research, relatively dark particles will appear within the chromophore and must be removed from the integrated optical density measurements. This may be achieved with the help of the grain detection circuitry. This circuitry develops digitized object pulses that correspond to detected particles herein desscribed as grains. The comparator of FIG. 2 may be gated off by these pulses so that the area of these particles will be subtracted from the area counts obtained by the computer. The integration procedure occurs as before but with grain areas excluded. The area excluded is available to the computer as shown elsewhere and will be denoted by G. A corrected result for the integration can be developed with a simple computer program algorithm to simulate the following equation:

$$A\overline{D} = A\overline{D} + G\overline{D} = A\overline{D}(1 + G/A) \quad (4)$$

where A in this case is the total area of chromophore excluding the enclosed grain area G. This correction provides a result which presumes that there is chromophore in the grain locations with density equal to that of the average density of chromophore present elsewhere.

Figure 5:
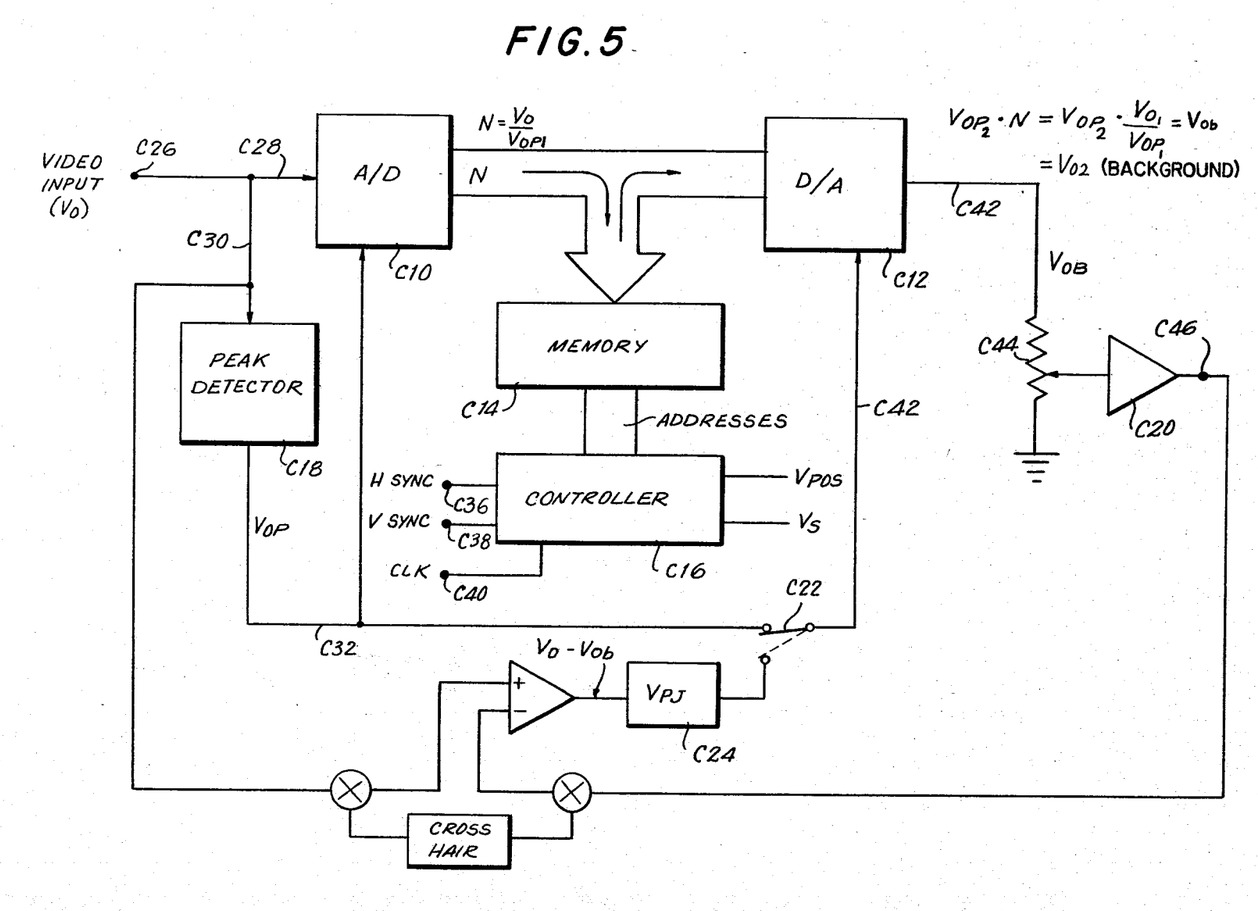
FIG. 5 is a block diagram of a shading corrector provided in accordance with another embodiment of the invention.

FIG. 5 illustrates a further shading corrector provided in accordance with the invention. It consists of an analog-to-digital converter C10 and a digital-to-analog converter C12. Also included is a memory C14 and a controller C16. Furthermore, included in the circuitry is a peak detector circuit C18 and an output amplifier indicated at C20.

A switch C22, the purpose of which will be hereinafter described, selectively substitutes in the aforegoing circuitry a source of a signal, the source being indicated at C24.

A video input signal $V_o$ is received at terminal C26 and transmitted via lines C28 and C30 to analog-to-digital converter C10 and peak detector C18 respectively. The peak detector C18 is intended to detect peaks in the signal $V_o$ during a vertical field, and peak signal $V_{op}$ is transmitted via line C32 and line C34 to circuit C10. C10 provides the signal N which is equal to $V_o/V_{op}$.

Locations in the memory C14 are selected by controller C16 which transmits addresses as indicated. These addresses are selected in conformity with the horizontal synchronization signal received at terminal C36 and the vertical synchronization signal received at terminal C38. A clock signal is transmitted to the controller C16 via terminal C40 to function in conventional manner. The signal Vpos is input to the controller from the control card 80. Vpos determines the starting position of the vertical field Vs during which objects may be measured. The controller then counts horizontal sync pulses and provides the output signal Vs. The period of Vs is generally 228 lines for 60 HZ or 256 lines for 50 HZ fields. Selected signals from memory C14 are transmitted to the digital-to-analog converter circuit C12 which also receives the peak signal $V_{op}$ via line C42. An output signal $V_{ob}$ is transmitted via line C42 to attenuator C44. Signal $V_{ob}$ is obtained according to the following:

$$V_{op2} \cdot N = V_{op2} \cdot V_{o1}/V_{op1} = V_{ob}$$

Here the subscripts 1 and 2 have been added to $V_o$ and $V_{op}$ to indicate signals before and after memory storage respectively. $V_{o1}$ is obtained from an image with no objects.

If the peak point of image, corresponding to $V_{op}$, has not been obscured by an object, then $V_{ob}$ is truly the background representation of $V_{o2}$, the current image voltage.

$$V_{ob} = V_{op2}/V_{op1} \cdot V_{o1} = V_{o2}/V_{o1} \cdot V_{o1} = V_{o2}$$
(Background)

Thus, the memory provides the shape of the required background signal while the continuous correction with $V_{op}$ maintains proper background signal level. $V_{ob}$ will be insensitive to image drift.

Attenuation of signals $V_{ob}$ is provided by attenuator C44, power being supplied by amplifier C20 to transmit an output signal via terminal C46.

Figure 6:
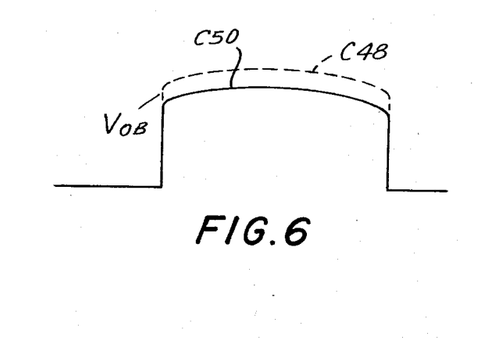
FIGS. 6 and 7 illustrate voltage signals employed for the purposes of scanning and modified according to shading corrections provided in accordance with the invention.
Figure 7:
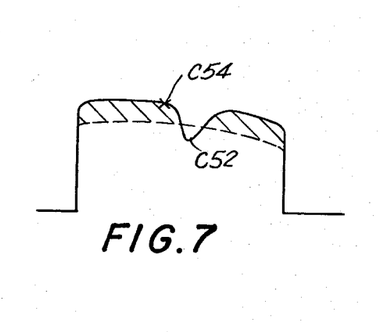
Figure 8:
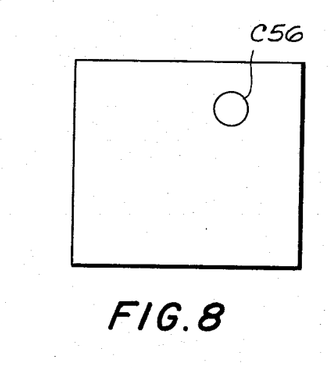
FIG. 8 illustrates a field and denotes the preferred area of shading correction.
Figure 9:
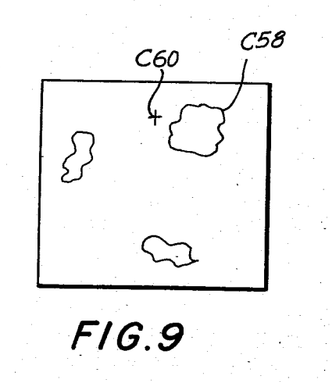
FIG. 9 illustrates the field of FIG. 8 with objects to be counted or inspected therein with one of the objects coinciding with the correction area illustrated in FIG. 8.

The normal correction of the signal, such as has been indicated above, in accordance with the invention, sometimes finds interference when specimens to be counted are provided to the field. Referring next to FIG. 6, it is seen that a scanning signal $V_{ob}$ may require correction according to what is indicated by dotted line C48. If in fact the scan line were of constant amplitude, correction would not be required. However, the scanning line is not of constant amplitude and varies according to a large number of possibilities, such as uneven light distribution, optical aberrations and TV camera shading affects. The peak voltage occurring during a TV field may be obscured when specimens are introduced into the field. Under these conditions, a new peak is established at some lesser amplitude thusly depressing $V_{ob}$ to the level C50. An example of this phenomenon is illustrated by observing the location C56 in FIG. 8. Prior to the introduction of specimens, a peak occurred at the location C56. Arbitrary placement of specimens in the field obscure the prior video peak at the location C56 by the specimen at location C58 in FIG. 9 Local background variations may also occur due to nonhomogeneous preparations of the background material.

The variation of the synthesized background, as described above, would not overly affect the detection of most objects, however, accuracies of better than 5% may become unattainable. Moreover, integrated density measurements which rely on the accurate detection of both area and threshold would become meaningless.

The present embodiment overcomes the deficiencies of video peaks and nonhomogeneous background by the introduction of a local background measurement. The local background measurement provides the multiplying factor necessary to modify the stored background adjacent to the particular object for which data is required. One method of detecting local backgrounds would be to enclose the object under measurement by some electronic or mechanical means and sample the background all around the object. This method could be accomplished with the electronic aperture, described elsewhere. Another method, and the one used in the present embodiment, is to sample the background adjacent to the object, at a point, in a clear area. Both background Vob and current video Vo are sampled, thusly providing a difference signal Vo-Vob referred to as $V_{ps}$ is FIG. 5. The area is selected by positioning a electronically generated crosshair signal. There is provided a controllable crosshair indicated at C60 whereby the portion of the background on which correction is to be based is selected from a juxtaposed zone adjacent the object to be inspected, namely object C58. Switch C22 is used to connect the multiplying factor or correction signal Vo-$V_{ob}$ (or $V_{pj}$) to D/A converter C12 in place of the peak detector output $V_{op}$. The resulting circuit forms a feedback loop such that at equilibrium D/A converter C12 will output a background voltage $V_{ob}$ that forces Vo−$V_{ob}$ or Vpj to zero. This corresponds to Vo=$V_{ob}$ at the crosshair location in the background at C60 in FIG. 9. Thus, the synthesized background voltage $V_{ob}$, is made equivalent to the current video background level in the vicinity of object C58 in FIG. 9. Accordingly, the correction to be made by the circuit of FIG. 5 can be made according to the selected position indicated by crosshair C60 as selected by the operator of the device.

As mentioned hereinabove the invention also relates to the utilization of a light pen or the like for purpose of modification of image measurements, such as area, perimeter, and so forth.

Digitized video pulses representing objects in the scanned television field are the basic source for many image measurements such as area, perimeter, and object counts. These pulses are derived by various detection methods. If the detection of objects is deficient and the pulsed representation is too large or too small or otherwise distorted, operator intervention to correct these effects becomes desirable. This can be done by storing the 2-level digitized video signal in an electronic memory. The desired resolution of the stored image dictates the size of memory required where one bit of memory is required for each elemental picture element or "pixel." If the same memory is accessible by another device such as a computer, then the stored image may be modified by that device. Therefore, an operator could initiate by means of the computer image modifications without any dependence on the original image The memory must, of course, be continuously "read-out" to produce an image of its content for operator viewing. A light pen or joystick and crosshair may be incorporated so the operato can easily direct modifications to specific points in the stored image.

Figure 10:
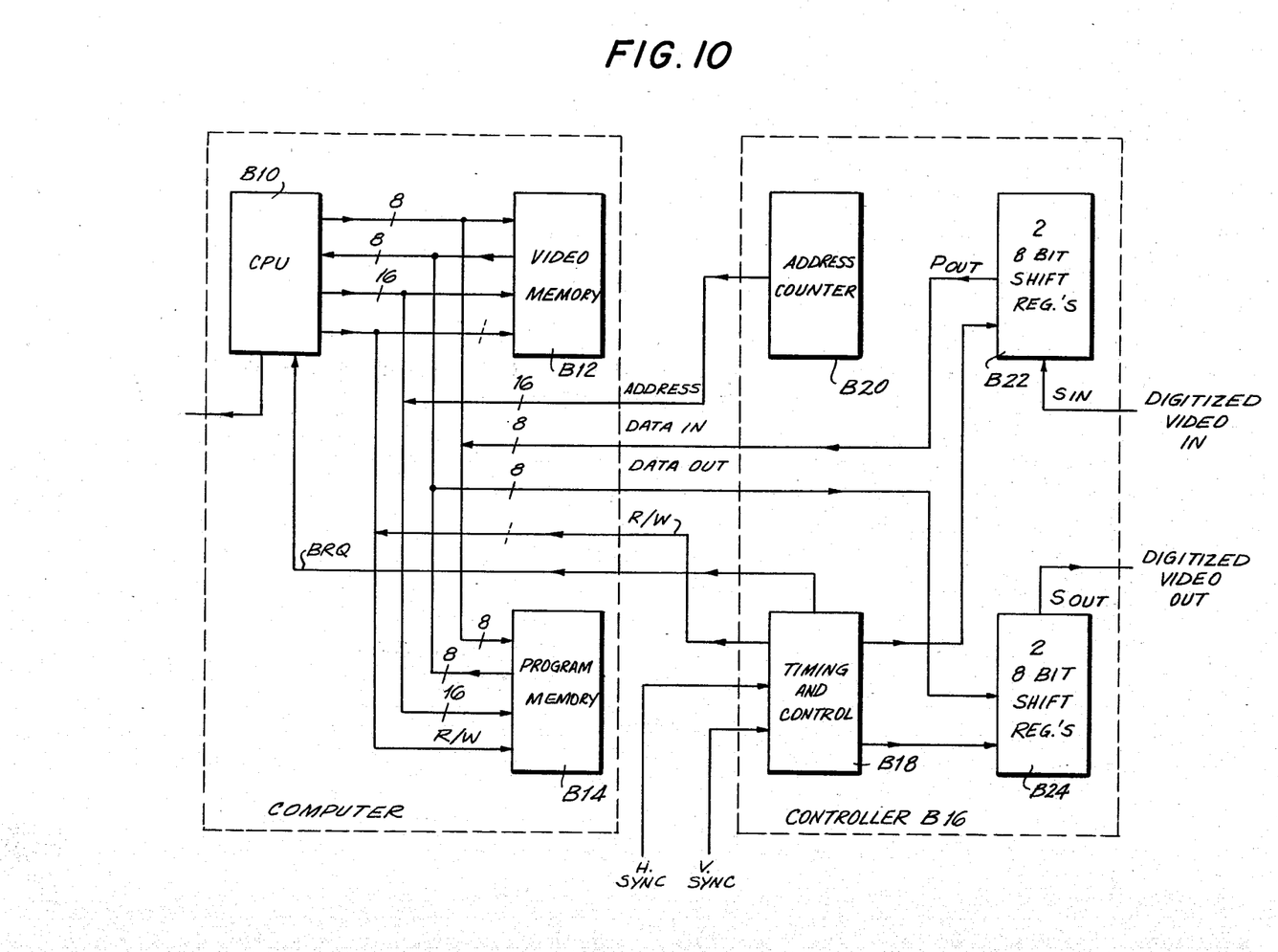
FIG. 10 is a block diagram of a circuit adapted for the modification of a stored video image in accordance with another aspect of the invention.

FIG. 10 is a block diagram of the essentials for storing and reading out a digitized video image from a memory. A computer central processing unit (CPU) B10) as shown accessing both a video memory B12 and a program memory B14. The latter contains programmed algorithms to perform required image processing on stored images in the video section of the memory. THese programs are selected by the operator through computer input/output with a suitably interfaced device such as a terminal. The components discussed to this point are the typical partitions of a computer and are collectively identified as such in FIG. 10. FIG. 10 is of course simplified and shows only the computer bus signal lines to this discussion.

The circuitry concerned with storing and retrieving digitize video images from the video section of the computer memory is identified as the controller B16 in FIG. 10. A timing and control block B18 is also shown in FIG. 10 which receives horizontal and vertical sync signals from the television systems used to develop the object image.

During sync time when television video is inactive, the timing and control block B18 surrenders all busses to the CPU B10 through the bus request line (BRQ). At this time, computer programs may operate on the video memory. During active video time, the CPU is disabled and the controller takes over all busses and the read-/write (R/W) line. The address counter B20 is stepped in synchronism with the television raster so that each and every location in the video memory is addressed during a television scan. Each time a given pixel is scanned, the same video memory location is addressed. By means of the R/W line then, the video memory B12 can be formed to store or output digitized video as required.

The memory used, however, is not serial or accessible bit by bit. Instead, to be compatible with the CPU used, it is comprised of 8 bit-wide bytes or words. To achieve an interface between the serial-byte-parallel-bit video memory and the essentially serial-bit digitized video, shift registers B22 and B24 are used in the controller B16. Timed by the timing and control block B18, digitized video is shifted into an 8 bit serial-in-parallel-out shift register. When the register is full the 8 bits may be stored in memory. Similarly, an 8 bit parallel-in-serial-out shift register may be loaded with an 8 bit video memory byte and the digitized video shifted out.

Actually, 2 shift registers are used for read or write. The registers are time shared to work on alternate bytes. Thus, while one register is shifting digitized video in or out the other will output or input another 8 bit byte. This minimizes memory access speed problems. Although the bit shift rate is high, 8 bit-shift times periods are available to access each byte of memory.

Thus, digitized video can be stored in and continuously output from a video memory. The output may be superimposed on a television monitor so that any CPU modifications of video memory can be observed. Each pixel of the raster is associated with a video memory byte and a bit position within that byte. Suitable programming allows the CPU to operate usefully on the memory. the raster point to video memory mapping relationship can be translated into cartesian or other coordinate systems through the software to simplify the image processing programs used.

Figure 11:
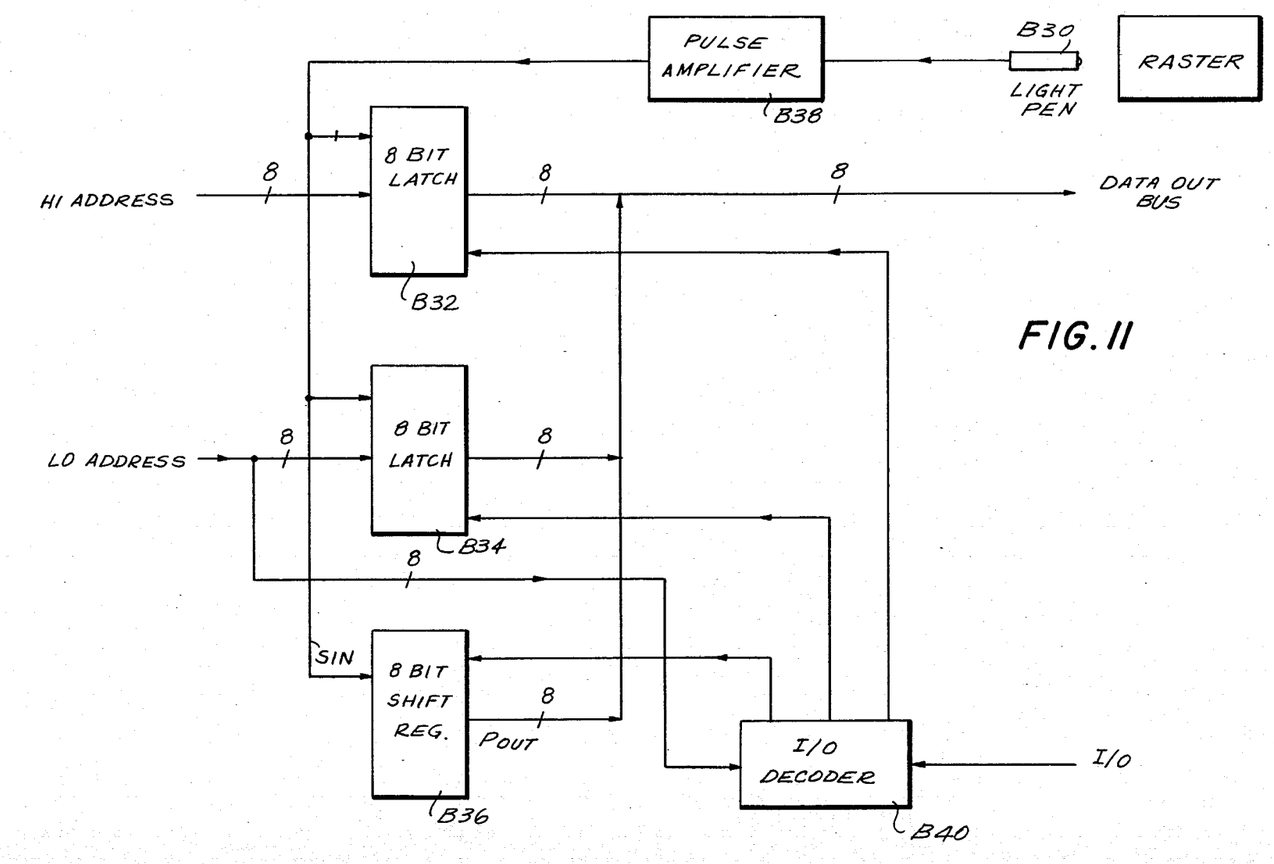
FIG. 11 is a block diagram illustrating the utilization of a light pen in conjunction with the circuitry of FIG. 10 in accordance with yet another aspect of the invention.

In order that the operator may direct the computer program to a particular point in memory and therefore a particular point on the television raster, a light pen B30 and associated circuitry of FIG. 11 are included in the controller. Lighe pens are known per se and it will be readily understood that, with the light pen pressed against the associated monitor screen, the pen will output a short pulse when the monitor raster scans past it. The pulse is amplified and conditioned and used to activate two 8 bit latches B32 and B34 and 8 bit shift register B36. The serial input to the shift register is the pen pulse which arrives via amplifier B38 and line SIN and it is shifted in at the same rate as digitized video in the other shift registers of the controller.

The first address change after the pen pulse occurs stops the shift process. In this way, a memory address as stored in the latches B32 and B34 and a bit position as stored in the shift register B36 are available to the CPU to locate the specific bit in the memory that corresponds to the light pen position on the monitor screen. The CPU accesses this data by means of the data bus and by strobing an I/O decoder B40 in a series of normal CPU input instructions.

The pen pulse may be substituted for by any convenient timing event that occurs synchronously with the television raster. By means of a joystick controlling orthogonally mounted potentiometers and suitable electronics, a crosshair image can be superimposed on the television monitor display. The crosshair position corresponds to movement of the joystick. A pulse that occurs at the center of the crosshair may substitute for the pen pulse. The joystick and crosshair may then be used by the operator for the same purposes as the light pen.

Separate hardware/software interfacing of the CPU with an external terminal or keyboard allows an operator to select different image processing programs from a repertoire stored in program memory. The command to store an image or a command to completely disable video memory access can be user-initiated by these means as well. By way of example, the shape of a cell may be modified to add to it, subtract from it, to change its shade, to delete it entirely, and so forth.

From what has been indicated hereinabove, improvements have been made to image analyzers according to the present invention. There will now be obvious to those skilled in the art many modifications and variations of the circuitry set forth hereinabove. These modifications and variations will not depart from the scope of the invention if defined by the following claims.

What is claimed is:

1. In an image analyzer for counting objects in a field, a shading corrector adapted for measuring the relative amount of chromophore in a scanned object comprising means to supply a stored video background signal, an attenuator for receiving and attenuating said signal, computer means for controlling said attenuator, means to supply an object-modulated video signal, comparator means for comparing the attenuated signal and the video signal to produce a comparator output signal, and area counter means to receive said output signal and develop a count proportional to the time-width of the scan across the chromophore to represent the area of the chromophore, said count being fed to said computer means.

2. A shading corrector as claimed in claim 1 wherein said attenuator is a digitally controlled attenuator.

3. In an image analyzer for counting objects in a field, a shading corrector adapted for correcting background signals representative of the background against which objects are counted, said shading corrector comprising means for receiving background video signals representative of a field with and without objects therein, peak detector means to detect peaks in said signals and to generate signals in accordance therewith, processing means responsive to said video signals and to said peak detector means to generate signals corresponding to the ratio of said video signals and the signals of said peak detector means, memory means to store the signals generated by said processing means, and further processing means to receive signals from the peak detector means and to combine them with the thusly stored signals to generate shade corrected signals.

4. A shading corrector as claimed in claim 3 wherein the first said processing means includes an analog-to-digital converting means whereby to produce a digital signal for storage.

5. A shading corrector as claimed in claim 4 wherein the second said processing means includes a digital-to-analog converting means whereby to produce an analog output signal.

6. A shading corrector as claimed in claim 5 comprising attenuation means to vary the magnitude of the analog output signal.

7. A shading corrector as claimed in claim 3 comprising means coupled to said processing means to generate a shading corrector background voltage and to cause the same to be substantially equal to the video background voltage at a selected point and approximately equal to the video background voltage at all other points of video background.

8. A shading corrector as claimed in claim 5 comprising means coupled to said processing means to generate a shading corrector background voltage and to cause the same to be substantially equal to the video background voltage at a selected point and approximately equal to the video background voltage at all other points of video background.

* * * * *